Feb. 10, 1970     W. H. SAYLOR     3,495,240
PLURAL ELECTROMAGNET BINARY DECODING POSITIONING DEVICE
Filed Nov. 25, 1968     2 Sheets-Sheet 1

INVENTOR
WILLIAM H. SAYLOR
BY
Delman H. Jansen
AGENT

Feb. 10, 1970 W. H. SAYLOR 3,495,240
PLURAL ELECTROMAGNET BINARY DECODING POSITIONING DEVICE
Filed Nov. 25, 1968 2 Sheets-Sheet 2

INVENTOR
WILLIAM H. SAYLOR
BY
AGENT

United States Patent Office 3,495,240
Patented Feb. 10, 1970

3,495,240
PLURAL ELECTROMAGNET BINARY DECODING POSITIONING DEVICE
William H. Saylor, 31791 S. Coast Highway,
South Laguna, Calif. 92677
Continuation-in-part of application Ser. No. 593,384,
Nov. 10, 1966. This application Nov. 25, 1968, Ser.
No. 778,740
Int. Cl. G08b 5/00
U.S. Cl. 340—373
8 Claims

ABSTRACT OF THE DISCLOSURE

A positioning device operated by binary electrical signals comprises four electromagnets, responsive to signals of magnitude plus 1, plus 2, plus 4 and minus 4 respectively. The first two electromagnets share a moveable armature, as does the second pair. The first magnet is fixed to a base, while the other three are rotatable only as a unit, the mechanical arrangement being such that coded binary signals applied to the magnets variously shift the positions of the armatures and of the three-magnet array so as to position a readout mechanism, which may be visual, a printout, or other form of registration, and which may be decimal.

---

This application is a continuation-in-part of my co-pending application Ser. No. 593,384, filed Nov. 10, 1966 and now Patent No. 3,414,854.

This invention relates to devices which are actuated by binary coded signals, to give a readout and/or printout, most generally in decimal form.

As is well known, many present-day computers, telemetering transmitters, and like apparatus present a signal in the form of binary code. In order for such a signal to be useful to the ultimate receptor, it generally must be transformed into decimal notation, or in some cases, a combination of decimal or alphabetic notation, with the result of such a transformation being presented in any of several fashions, separately or simultaneously, such as a readout or a printout. It is possible to accomplish this by feeding the binary signal into a suitable electronic module, which carries out the desired binary-to-decimal transformation, whereupon the resulting signal is fed to a suitable mechanical device capable of receiving a decimal signal and presenting it as a readout or a printout. Numerous attempts have been made to combine the two functions of display and decoding, this being desirable from many standpoints, including those of cost, compactness, and reliability. Some prior art solutions to this problem have not turned out to be practical, generally because of inherent mechanical clumsiness, leading to oversized units; the necessity of too high a power input to operate the device, which in turn complicates pre-amplifier design and leads to heat dissipation problems; and like considerations.

An object of the present invention is to provide a positioning device, the positioning element of which may be used to operate a printout or readout or both, which operates directly from binary signals which may be of relatively low wattage and short pulse duration; which is capable of being manufactured in an exceedingly compact and, particularly, thin form; and which can be manufactured so as to be mechanically reliable even after millions of cycles of operation.

Other objects of the present invention will appear as the description thereof proceeds.

In the drawings:

FIGURE 1 is a plan view of an exemplary device embodying my invention, while

Generally speaking, and in accordance with an illustrative embodiment of my invention, I provide a positioning device responsive to coded voltage signals of the type described which comprises a base plate bearing a registration means such as a readout or printout wheel, which is actuated by an armature in essentially bar form which is able to rotate about a pivot affixed to the base; and the position of which is dependent upon the energizing, or lack of energizing, of four electromagnets, one of which is affixed to the base, while the other three of which are fixed with respect to each other but rotatable as a unit about the pivot. An armature is also provided between the electromagnet affixed to the base and one of the electromagnets in the affixed array, likewise operating of an armature movable about the pivot. The electromagnets are maintained separated from their respective armature in the energized state by springs.

The general and summary description just given may better be understood by reference to the drawings. Therein, 10 is a base plate, which conveniently forms one of the flat sides of a thin case in which the mechanism is housed. For the sake of clarity, cover plate 15 has been depicted as largely cut away in FIGURE 1 so as to expose the working parts within the housing, which is conveniently completed by a rectangular frame 16 to which the base plate 10 and cover plate 15 are fastened.

Figure 5:
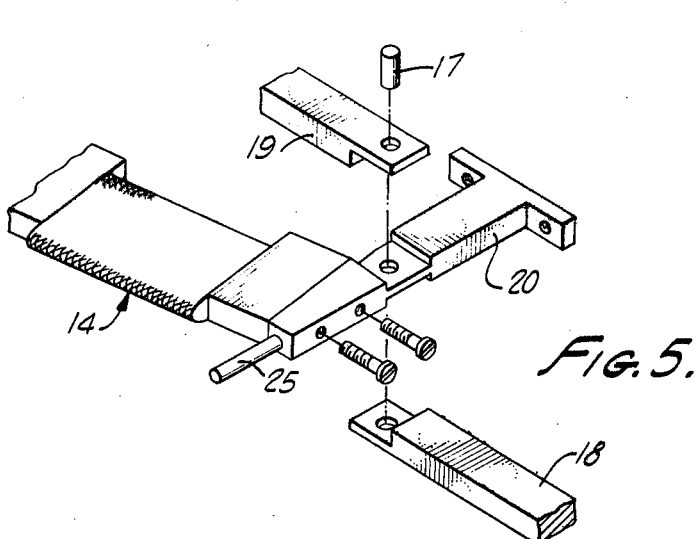
FIGURE 5 is an exploded perspective detail view of a portion of the device of FIGURE 1.

A pivot 17 is affixed to the base 10, and serves as the center of rotation of a first armature 18, as well as a center of rotation of a second armature 19. It also serves as the center of rotation of movable frame means 20. A convenient manner of arranging these rotatable parts about the single pivot is shown in the drawings, particularly in the exploded view of FIGURE 5.

A first electromagnet 11 is attached to the base means, and thus is fixed in position with respect to the latter. This electromagnet contains a coil 21 and a yoke presenting pole pieces 22 and 23. As will be observed from the drawings, armature 18 is within the force field of electromagnet 11, so that the two will tend to be drawn together when the latter is energized.

Three essentially similar electromagnets 12, 13 and 14, are attached to the movable frame means 20, so that while they maintain their mutually respective positions, they may nevertheless rotate as a unit about the pivot 17. Electromagnet 12 is opposite electromagnet 11 in an essentially similar relationship to armature 18. Similarly, electromagnets 13 and 14 are opposite armature 19.

A tension spring 24 is attached between a stud 25 on the frame means 20 and a stud 26 on the base plate. This spring thus urges the entire frame assembly with its three magnets in a counterclockwise direction, as is clear from FIGURE 1. A compression spring 27 is carried in the far end of the yoke of electromagnet 13, and a similar compression spring 28 is carried in magnet 14. A rod 29 traverses spring 27 and protrudes against armature 19. Similarly, rod 30 traverses spring 28. Rod 29 carries washer or flange 31, which bears against spring 27. Washer 32 serves a similar function on rod 30. Except as restrained by the flanges and compression springs, rods 29 and 30 are free to move longitudinally; that is, they can be pushed in against their respective springs 27 and 28. It will be clear, therefore, that the effect of springs 27 and 28 is to urge their respective magnets 13 and 14 away from armature 19, thus keeping the gap open, absent a signal. Adjustable stop means 33 and 34 are provided, to limit the extent to which the various magnets can be forced away from their respective armatures in their unenergized position, as will be clear from the drawings.

Furthermore, the relative dimensions of the device and the settings of the stop means 33 and 34 are selected so that in the unenergized positions, the gap between magnet 12 and armature 18 is twice the gap between magnet 11 and armature 18. Moreover, the gaps in the unenergized state between magnets 13 and 14 and armature 19 are both four times the "unit" gap between magnet 11 and armature 18.

It will be observed that when the gaps are closed, by energizing the respective electromagnets, the net effect upon the final position assumed by armature 19 is additive, taking due account of the negative sense of magnet 14. For example, if only magnet 12 is energized, the framework will move clockwise by two units, and that will be the net change in position of armature 19. As another example, if at the same time magnet 11 is energized, that will then draw armature 18 is a clockwise direction by one unit, giving a total clockwise shift of armature 19 of three units. As a further example, if with both magnets 11 and 12 energized, magnet 14 is energized, this will move armature 19 counterclockwise by four units, making a net negative shift from the unenergized position of unity.

Figure 2:
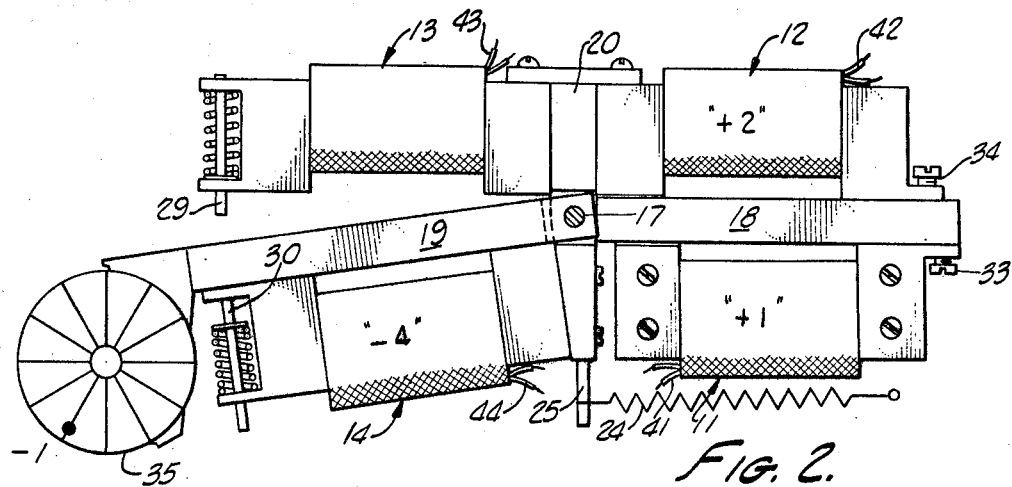
FIGURES 2, 3 and 4 are partially schematic views showing the device of FIGURE 1 in various positions according to the energizing signal applied.
Figure 3:
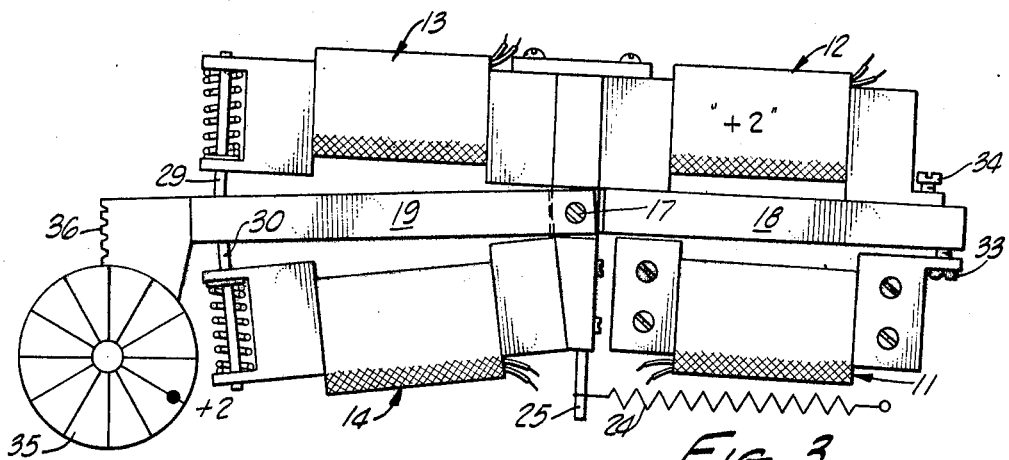
Figure 4:
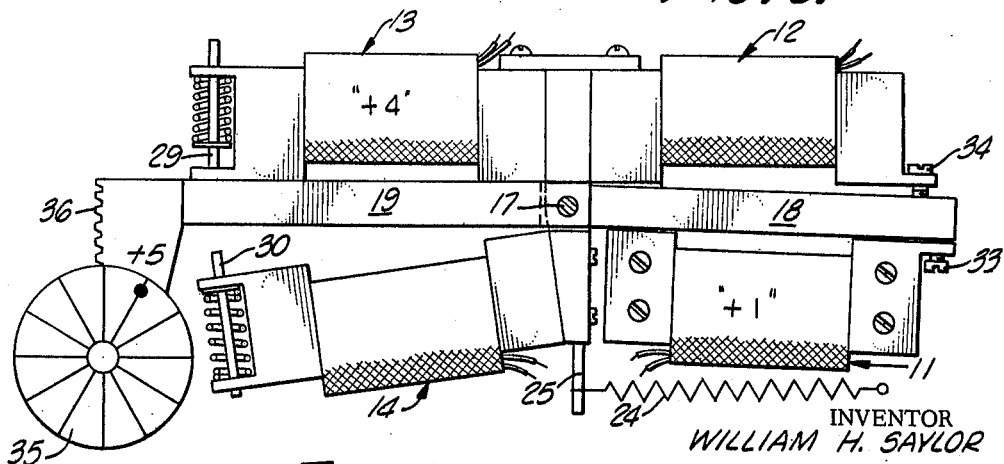

In order to more fully illustrate the shifts in position of the various component parts of my device under different situations of energization, FIGURES 2, 3 and 4 show the essential structures of the device when three different binary signals are applied. In FIGURE 2, magnets 11, 12 and 14 are energized, as in the illustration just given. In FIGURE 3, only magnet 12 is energized, giving a net shift of plus 2. In FIGURE 4, magnets 11 and 13 are energized, giving a shift of plus 5.

Figure 6:
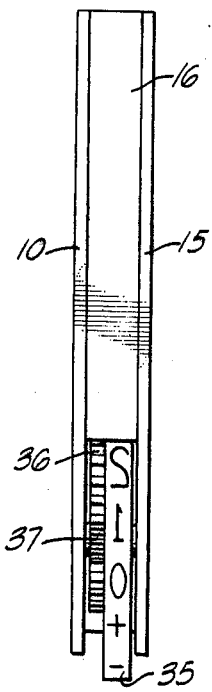
FIGURE 6 is an end view thereof.
Figure 7:
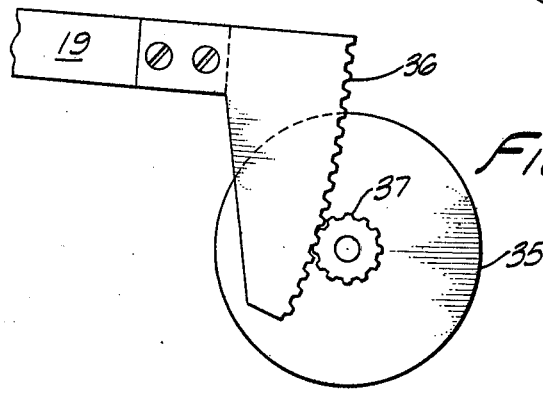
FIGURE 7 is a detail view of the readout-printout portion of the device of FIGURE 5.

It will be apparent from the foregoing that armature 19 assumes a position, upon energizing the device with a binary signal, which represents the value of the binary signal. The latter is made accessible by any convenient constrcution, for which I prefer that shown in the drawings, in which armature 19 actuates a readout-printout drum 35, as by the rack or sector gear 36 and pinion gear 37. FIGURE 7 is a bottom detail view thereof. It is convenient to have the readout wheel 35 protruding slightly from the housing, as shown in the drawings, so that it may function as a printout wheel as well as a readout wheel, providing raised type characters on the periphery thereof as shown in FIGURE 6. Thus, printout can be readily obtained which registers the position of the wheel by means commonplace in the art, generally involving the mutual impact of the wheel with paper and a carbon ribbon or the like. Needless to say, applicable portions of such standard devices as typewriters, adding machines, cash registers, and the like may be operatively connected to the printout wheel to give the particular form of record desired.

It may be noted that in FIGURES 2, 3, and 4, not only is the final position of armature 19 shown, but also the position to which printout wheel 35 has been rotated.

In order to receive binary signals, the wire leads 41, 42, 43, and 44 to their respective electromagnets are led outside the case and connected to the signal source, in commonplace fashion.

The manner of connecting the binary input signal to the coils will be obvious to those skilled in the art. For example, using the apparatus of FIGURE 1, and receiving a pure binary code, coils 11, 12, 13 and 14 are connected respectively to the first, second, third, and fourth binary positions, having relative values of 1, 2, plus 4, and minus 4 respectively.

Some typical connections are shown in the tables which follow. The first is for pure binary code, while the second is for cyclic Gray code. The column marked "readout" is the decimal number to be read out, while the column marked "position" is the position of the readout/printout wheel 35. The body of each table shows the binary number to be decoded and read out, and the column headings A, B, C, and D, indicate gap shifts of magnitude 1, 2, 4, and minus 4, respectively, which as has been explained hereinabove, corresponds to coils 11, 12, 13, and 14, respectively.

TABLE 1

| Readout: | D | C | B | A | Position |
|---|---|---|---|---|---|
| 0 | 0 | 0 | 0 | 0 | 0 |
| 1 | 0 | 0 | 0 | 1 | 1 |
| 2 | 0 | 0 | 1 | 0 | 2 |
| 3 | 0 | 0 | 1 | 1 | 3 |
| 4 | 0 | 1 | 0 | 0 | 4 |
| 5 | 0 | 1 | 0 | 1 | 5 |
| 6 | 0 | 1 | 1 | 0 | 6 |
| 7 | 0 | 1 | 1 | 1 | 7 |
| 8 | 1 | 0 | 0 | 0 | −4 |
| 9 | 1 | 0 | 0 | 1 | −3 |
| + | 1 | 0 | 1 | 0 | −2 |
| − | 1 | 0 | 1 | 1 | −1 |

TABLE 2

| Readout: | A | B | C | D | Position |
|---|---|---|---|---|---|
| 0 | 0 | 0 | 0 | 1 | −4 |
| 1 | 0 | 0 | 1 | 1 | −2 |
| 2 | 0 | 0 | 1 | 0 | 2 |
| 3 | 0 | 1 | 1 | 0 | 6 |
| 4 | 0 | 1 | 0 | 0 | 4 |
| 5 | 1 | 1 | 0 | 0 | 5 |
| 6 | 1 | 1 | 1 | 0 | 7 |
| 7 | 1 | 0 | 1 | 0 | 3 |
| 8 | 1 | 0 | 1 | 1 | −1 |
| 9 | 1 | 0 | 0 | 1 | −3 |

The device can also be used for binary systems other than the two already discussed in which ambiguity would be introduced by the necessity of both coils 13 and 14 being simultaneously energized. This is accomplished by providing a simple circuit in the input module which converts 11 to 00 for the C and D signals. Such a circuit is commonplace in the art and need not be described in detail. The adaptation to such binary number systems is shown in the following tables, wherein the rows with an asterisk indicate that a circuit has been introduced to carry out the conversion just discussed. Table 3 is for the so-called "Excess 3" binary, code, while Table 4 is for "(2421)" code.

TABLE 3

| Readout: | D | C | B | A | Position |
|---|---|---|---|---|---|
| 0 | 0 | 0 | 1 | 1 | 3 |
| 1 | 0 | 1 | 0 | 0 | 4 |
| 2 | 0 | 1 | 0 | 1 | 5 |
| 3 | 0 | 1 | 1 | 0 | 6 |
| 4 | 0 | 1 | 1 | 1 | 7 |
| 5 | 1 | 0 | 0 | 0 | −4 |
| 6 | 1 | 0 | 0 | 1 | −3 |
| 7 | 1 | 0 | 1 | 0 | −2 |
| 8 | 1 | 0 | 1 | 1 | −1 |
| 9 | *1 | 1 | 0 | 0 | 0 |
| + | *1 | 1 | 0 | 1 | 1 |
| − | *1 | 1 | 1 | 0 | 2 |

TABLE 4

| Readout: | A | C | B | D | Position |
|---|---|---|---|---|---|
| 0 | 0 | 0 | 0 | 0 | 0 |
| 1 | 0 | 0 | 0 | 1 | −4 |
| 2 | 0 | 0 | 1 | 0 | 2 |
| 3 | 0 | 0 | 1 | 1 | −2 |
| 4 | 0 | 1 | 0 | 0 | 4 |
| 5 | 1 | 0 | 1 | 1 | −1 |
| 6 | 1 | 0 | 0 | 0 | 5 |
| 7 | *1 | 1 | 0 | 1 | 1 |
| 8 | 1 | 1 | 1 | 0 | 7 |
| 9 | *1 | 1 | 1 | 1 | −3 |

I find it convenient, although not essential, to provide a latching mechanism so that whatever position is taken up by printout wheel 35 as a result of an applied signal, may be retained until the latch is released. Thus, in some applications it is desired to retain any given readout after the actuating signal is removed. Such a latching mechanism also facilitates setting up a series of modular units of the type described in sequence with only one set of drivers and one set of common drive lines. Only the module that is to be set up will have its latch in position so that it can be moved. The others will receive the signal but will be unable to move because of the latch. Also, when one module is set up, it can hold that position while the others are being set up.

Figure 1:
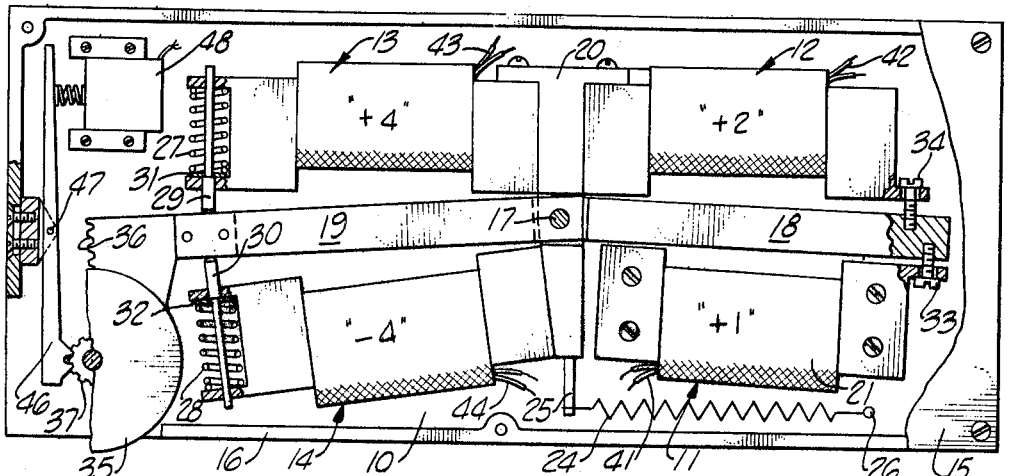

A suitable latch mechanism is shown in FIGURE 1, wherein pinion gear 37 is engaged by tooth-bearing latch bar 46, which is movable about pivot 47 by latch magnet 48, in a manner that will be clear by inspection.

A further advantage of the type of latching mechanism shown is that when several units are used to provide several number places in a printout, the type will be nicely lined up in a straight line, regardless of slight inaccuracies in the settings of the stops or play in the various linkages or in the gear meshing.

The device in accordance with the invention has a number of advantages, including particularly a sturdy and essentially simple mechanical action, since it possesses a very small number of moving parts, and all of those move only the barest minimum to achieve the desired result. The arrangement likewise permits good design from the standpoint of the electromagnetic forces involved, since the gaps may be kept relatively small, and considerable leverage is exerted on the armatures when they are moved into close position by an applied signal.

The materials of construction employed are those usual in the art and do not call for detailed discussion. For example, in the embodiment shown, base and cover 10 and 15 are conveniently of aluminum, as is frame 16. Armatures are of soft iron, and other working parts of nonmagnetic stainless steel. The printout wheel is of hardened steel.

A convenient size for ordinary applications of my device is to make frame 16 2½ inches by 5½ inches, with a thickness of ¼ inch as shown on FIGURE 6. This allows the ganging of any desired number of the inventive readout-printout modules to accommodate any desired number of decimal places in the final readout, while still conserving space.

I wish it to be understood that I do not desire to be limited to the exact details of construction shown and described, for obvious modifications will occur to a person skilled in the art.

Having described my invention, I claim:

1. A positioning device responsive to coded voltage signals comprising:
   a base plate means and a pivot means fixed in position thereto;
   a first electromagnet means fixed in position to said base plate means;
   frame means borne by said pivot and rotatable thereon;
   second, third and fourth electromagnet means affixed to said frame means;
   a first armature pivoted about said pivot and in gap-closing orientation jointly with respect to said first and second magnets;
   a second armature pivoted about said pivot and in gap-closing orientation jointly with respect to said third and fourth electromagnets;
   registration means linked to and actuated by movement of said second armature.

2. A device in accordance with claim 1 in which said device comprises spring means adapted to hold the gaps between said first armature and its associated first and second electromagnets and between said second armature and its associated third and fourth electromagnets, in open position in the absence of actuating signals.

3. A device in accordance with claim 2 which includes stop means providing gap separations in said unactuated state having magnitudes proportional to powers of two.

4. A device in accordance with claim 3 wherein said gap separations have the relative magnitude of unity between said first electromagnet and said first armature; of two between said second magnet and said first armature; and four between said third and fourth magnets and said second armature.

5. A device in accordance with claim 1 wherein said registration means includes printout means.

6. A device in accordance with claim 1 wherein said registration means includes visual readout means.

7. A device in accordance with claim 1 which includes latching means for releasably securing said second armature in its signal-actuated position.

8. A device in accordance with claim 4 wherein said registration means is a printout means, and which includes latching means for releasably securing said printout means in its signal-actuated position.

References Cited

UNITED STATES PATENTS 3,026,512   3/1962   Baker _____ 340—373

JOHN W. CALDWELL, Primary Examiner

H. I. PITTS, Assistant Examiner

U.S. Cl. X.R.

335—268; 340—324, 325, 378